US005675325A

United States Patent [19]

Taniguchi et al.

[11] Patent Number: 5,675,325

[45] Date of Patent: Oct. 7, 1997

[54] INFORMATION TRANSMITTING APPARATUS USING TUBE BODY

[75] Inventors: Ryosuke Taniguchi; Takashi Shimada; Takahiro Sakamoto, all of Tokyo, Japan

[73] Assignees: Japan National Oil Corporation; Mitsubishi Denki Kabushiki Kaisha, both of Tokyo, Japan

[21] Appl. No.: 546,128

[22] Filed: Oct. 20, 1995

[51] Int. Cl.$^6$ .......... G01V 1/40

[52] U.S. Cl. .......... 340/854.4; 367/82

[58] Field of Search .......... 367/82, 168; 340/854.4

[56] References Cited

U.S. PATENT DOCUMENTS

| | | | |
|---|---|---|---|
| 3,790,930 | 2/1974 | Lamel et al. | 367/82 |
| 3,900,827 | 8/1975 | Lamel et al. | 367/82 |
| 3,906,434 | 9/1975 | Lamel et al. | 367/82 |
| 4,283,780 | 8/1981 | Nardi | 367/82 |
| 4,293,936 | 10/1981 | Cox et al. | 367/82 |

FOREIGN PATENT DOCUMENTS

| | | |
|---|---|---|
| 0 552 833 | 7/1993 | European Pat. Off. . |
| 53-101453 | 9/1978 | Japan . |
| 56-125595 | 10/1981 | Japan . |
| 64-27331 | 1/1989 | Japan . |

*Primary Examiner*—Ian J. Lobo

*Attorney, Agent, or Firm*—Burns, Doane, Swecker & Mathis, LLP

[57] ABSTRACT

An information transmitting apparatus using a tube includes a magnetostrictive vibrator to generate a first elastic wave depending upon underground information, a resonance tube body resonating with the elastic wave to generate a second elastic wave having a natural frequency, and a drill string to propagate the second elastic wave, thereby permitting a long transmission distance.

10 Claims, 15 Drawing Sheets

INFORMATION TRANSMITTING APPARATUS USING TUBE BODY

BACKGROUND OF THE INVENTION

1. Field of the Invention

The present invention relates to an information transmitting apparatus using a tube body, which is used to transmit underground information through the tube body to the surface in real time, for example, during oil well or gas well drilling process.

2. Description of the Prior Art

In recent years, a measurement-while-drilling (MWD) system has been developed to transmit stratum information or drilling information to the surface in real time during drilling process in order to reduce drilling cost and enhance safety, and obtain the drilling information without delay so as to control the drilling process. As disclosed in, for example, European Patent Publication No. 0552833 A1, there is a well-known MWD system in the prior art, to transmit sound wave information by using a tube body employing piezoelectric ceramics serving as an oscillation source.

FIG. 1 is a side view of a system structure at a pit bottom, showing the conventional information transmitting system using the tube body employing the piezoelectric ceramics. In the drawing, reference numeral 1 means an oscillator using the piezoelectric ceramics to generate elastic waves by a piezoelectric effect of the piezoelectric ceramics. Burst voltage is applied to the oscillator to generate elastic waves having ultrasonic vibrations. Reference numeral 2 means a receiver tube on the receiving side, 3 is a receiving transducer to transduce received sound waves into electric information, and 4 is an MWD tool. Reference numeral 5 means a drill pipe, and a drill string includes an aligned extension of the drill pipes 5 as shown in the drawing. Reference numeral 6 means a drill collar to couple the drill pipe 5.

A description will now be given of the operation.

Ultrasonic waves generated from the oscillator 1 are transmitted to the tube body including the drill collar 6 and the drill pipe 5 so as to be propagated in an upper direction. In the conventional embodiment, the ultrasonic wave can be received by the receiving transducer 3 mounted on the receiver tube 2 which is disposed in the course of the tube body. Further, through the MWD tool 4, the information is transmitted toward the surface by, for example, a method using mud pulses serving as the elastic waves of slurry.

FIG. 2 is an exploded perspective view showing a structure of the oscillator 1 shown in FIG. 1. In the drawing, reference numeral 7 means ceramics crystals in which crystals are stacked side by side. FIG. 3 is a sectional view of the oscillator 1 shown in FIG. 1, in which reference numeral 8 means an elastic body such as spring, and 9 is a coupling portion to combine the oscillator 1 with the tube body. The oscillator 1 is disposed in a recess provided in the tube body, and one end thereof, i.e., the coupling portion 9 is pressed in contact with a lateral surface of the drill string to provide bias force to the stack of the ceramic crystals 7 such that vibration of the oscillator 1 can be coupled by the elastic body 8 into the tube body.

Next, a description will be given of signal waveforms propagated through the tube body.

FIG. 4A is a waveform diagram showing a drive voltage waveform of the oscillator of the conventional information transmitting apparatus using the tube body shown in FIG. 1, and FIG. 4B is a waveform diagram showing a propagated signal waveform in the conventional information transmitting apparatus shown in FIG. 1. In the drawings, reference numeral 10 means the drive voltage waveform of the oscillator 1, and 11 and 12 are propagation waveforms which are generated in the tube body.

First, carrier waves having frequency of about 20 KHz corresponding to resonance frequency of the oscillator 1, are applied to the ceramic crystals 7 as four-waves burst voltage which is a sine-wave burst including four cycles as shown in FIG. 4A for excitation of the ceramic crystals 7. For example, when the information at the pit bottom is converted into binary digital signals for transmission, modulation is made while corresponding a bit "1" to operation to excite the burst waveform, and corresponding another bit "0" to operation to excite no burst waveform. The vibration of the ceramic crystals 7 is propagated through the coupling portion 9 to the tube body, thereby generating ultrasonic vibrations including compression waves 11 and shear waves 12 as shown in FIG. 4B in the tube body.

Subsequently, a description will now be given of a method of modulation of the excitation voltage for the oscillator 1.

FIG. 5A is a burst voltage waveform diagram showing the bit "1" applied to the oscillator 1 of the conventional information transmitting apparatus shown in FIG. 1, and FIG. 5B is a burst voltage waveform diagram showing the bit "0" applied to the oscillator 1. As the excitation voltage for the oscillator 1, the burst voltages have excitation intervals corresponding to the binary bits. That is, the bit "1" is transmitted by exciting the oscillator 1 at a rate of 6.2 milliseconds, or the bit "0" is transmitted by exciting at a rate of 12.4 milliseconds.

The elastic waves are generated from the oscillator 1 by application of the burst voltage to provide the ultrasonic vibration. Further, the elastic waves are propagated to the upper side of the drill string to be detected by the receiving transducer 3 having a structure identical with that of the oscillator 1. Vibrations of piezoelectric crystals of the receiving transducer 3 can generate output voltage. Alternatively, a piezoelectric accelerometer may be used to detect the ultrasonic vibration.

The elastic waves detected by the receiving transducer 3 are converted into electric information, and thereafter pass through an unillustrated filter to remove their noise components. Subsequently, the elastic waves are converted by an unillustrated A/D converter into digital signals to be inputted into the MWD tool 4 and be transmitted in an upper direction by, for example, the mud pulses.

In this case, as the drill string (tube body) is longer, information in a deeper ground can be transmitted to the surface. However, a long tube body has a low resonance frequency. On the other hand, as set forth above, the conventional information transmitting apparatus using the tube body utilizes the piezoelectric effect of the piezoelectric ceramics to generate acoustic signals of the elastic waves. The piezoelectric ceramics generate the acoustic signal having frequency which is inversely proportional to a thickness of the stacked piezoelectric ceramics. Consequently, it is necessary to provide larger piezoelectric ceramics in order to generate the acoustic signal having a relatively low frequency. However, since the oscillator 1 is accommodated in the thin drill pipe 5, it is difficult to accommodate the large piezoelectric ceramics in the drill pipe 5. As a result, the piezoelectric ceramics should be small so that the piezoelectric ceramics generate an acoustic wave having a relatively high frequency, resulting in a relatively high resonance frequency of the tube body. Therefore, there is a problem in that the tube body having the high resonance frequency should naturally be short.

Otherwise, since thick stacked piezoelectric ceramics can reduce output, the piezoelectric ceramics should be downsized to ensure a required output level. As a result, the small piezoelectric ceramics cause the above problem.

Further, adhesive is used to stack the piezoelectric ceramics, and the adhesive serves as a damper with respect to the acoustic signals. As a result, there is another problem in that amplitude of the output acoustic signal is damped.

In addition, energy transmission of the acoustic signals from the piezoelectric ceramics to the tube body depends upon vibration combination through the coupling portion 9. Thus, the energy transmission is limited, and energy generated from the piezoelectric ceramics can not efficiently be transmitted to the tube body. The piezoelectric ceramics can provide extremely poor energy transmission efficiency of one percent or less. Therefore, it is necessary to ensure a large vibrator for outputting tremendous energy and a large power source according thereto such that the piezoelectric ceramics can excite and transmit the carrier waves to the tube body. However, there is a further problem in that it is very difficult to ensure the large vibrator and the large power source according thereto because of the thin drill pipe 5 as described above.

Due to the above problems, the conventional information transmitting apparatus using the tube body can be used for only local transmission having a distance of, for example, over ten but less than twenty meters. That is, it is difficult to transmit the underground information from the pit bottom via a distance of several kilometers to the surface.

SUMMARY OF THE INVENTION

In order to overcome the above problems, it is an object of the present invention to provide an information transmitting apparatus using a tube body, in which a transmission distance can be extended to enable transmission of underground information from a deep ground to the surface.

According to the first aspect of the present invention, for achieving the above-mentioned object, there is provided an information transmitting apparatus using a tube body, in which exciting current is fed to a magnetostrictive device depending upon the underground information so as to generate a first elastic wave, and the first elastic wave causes resonance of a resonance tube body so as to propagate a second elastic wave generated by the resonance vibration and having frequency inherent in the resonance tube body to the upper side of a drill string.

As stated above, according to the first aspect of the present invention, the underground information is detected by a detector, and a magnetostriction generation control unit outputs the exciting current depending upon the underground information from the detector. The magnetostrictive device generates the first elastic wave according to the exciting current from the magnetostriction generation control unit, and the resonance tube body resonates with the first elastic wave generated from the magnetostrictive device. Concurrently, the second elastic wave is generated by the resonance vibration, and has the frequency inherent in the resonance tube body to be propagated to the upper side of the drill string. Since the magnetostrictive device generates the elastic wave having a relatively low frequency, it is sufficient to provide a low frequency inherent in the resonance tube body resonating with the elastic wave. Therefore, the drill string can be further extended to enable the transmission of the underground information from the deeper portions of the well to the surface. Further, the energy transmission from the magnetostrictive device to the tube body is not made through coupling combination, but rather resonance, resulting in an enhanced transmission efficiency of the energy.

In the information transmitting apparatus using the tube body according to the second aspect of the present invention, the resonance tube body can resonate at a natural cycle which is determined by a propagation velocity of an elastic wave generated from the magnetostrictive device and by an entire length of the resonance tube body.

As stated above, according to the second aspect of the present invention, there is provided the resonance tube body resonating at the natural cycle which is determined by the propagation velocity of the elastic wave generated from the magnetostrictive device and by the entire length of the resonance tube body. Even if the vibration frequency inherent in the magnetostrictive device is different from resonance frequency of the resonance tube body, the resonance tube body can be resonated. As a result, it is possible to reduce difficulty in a dimensional design of the magnetostrictive device or in design of an electric circuit.

In the information transmitting apparatus using the tube body according to the third aspect of the present invention, a magnetostriction generation control unit applies exciting impulse current having a more rapid rise than distortion response velocity of a magnetostrictive device to the magnetostrictive device so as to generate impulse type distortion acceleration in the magnetostrictive device, thereby causing resonance of the resonance tube body according to the distortion acceleration.

In the information transmitting apparatus using the tube body according to the fourth aspect of the present invention, frequency of exciting impulse current applied to a magnetostrictive device is equalized with natural frequency of a resonance tube body such that oscillation frequency of the magnetostrictive device can be superimposed upon resonance frequency of the resonance tube body.

As stated above, according to the fourth aspect of the present invention, there is provided the magnetostrictive device which can generate vibration acceleration at the frequency of the exciting impulse current equalized with the natural frequency of the resonance tube body. Consequently, vibration energy of the resonance tube body can be superimposed upon vibration energy of an elastic wave of the magnetostrictive device. As a result, it is possible to more enhance a transmission efficiency of the vibration energy from the magnetostrictive device to the resonance tube body.

In the information transmitting apparatus using the tube body according to the fifth aspect of the present invention, a magnetostrictive device is disposed at an intermediate position of a resonance tube body so as to provide the maximum amplitude of vibration of the resonance tube body.

As stated above, according to the fifth aspect of the present invention, there is provided the resonance tube body in which the magnetostrictive device is disposed at the intermediate position thereof. It is thereby possible to superimpose the maximum vibration energy of the resonance tube body on vibration energy of an elastic wave.

BRIEF DESCRIPTION OF THE DRAWINGS

The above object and features of the present invention will be more fully understood from the following preferred embodiments when read in conjunction with the accompanying drawings, wherein.

DETAILED DESCRIPTION OF THE PREFERRED EMBODIMENTS

One embodiment of the invention will now be described in detail referring to the accompanying drawings.

Figure 6:
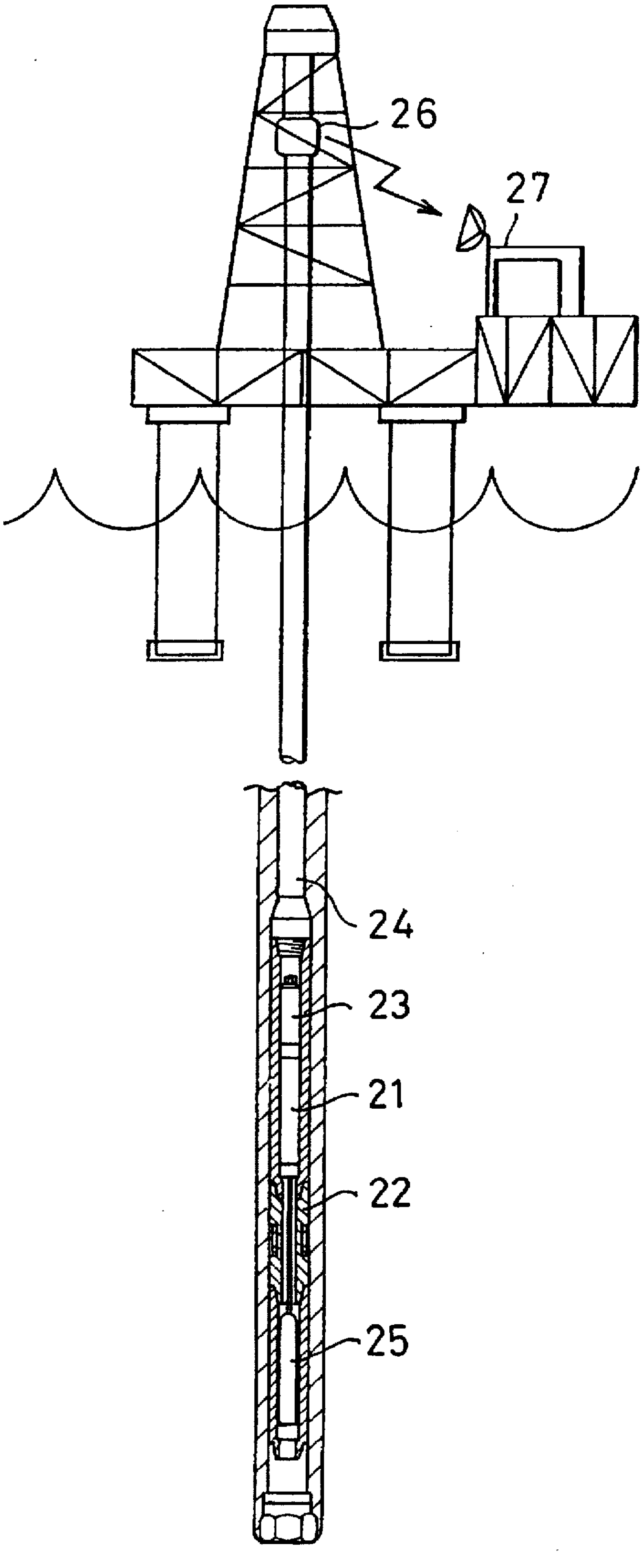
FIG. 6 is a diagram showing a structure in an information transmitting apparatus using a tube body according to one embodiment of the present invention.
Figure 7:
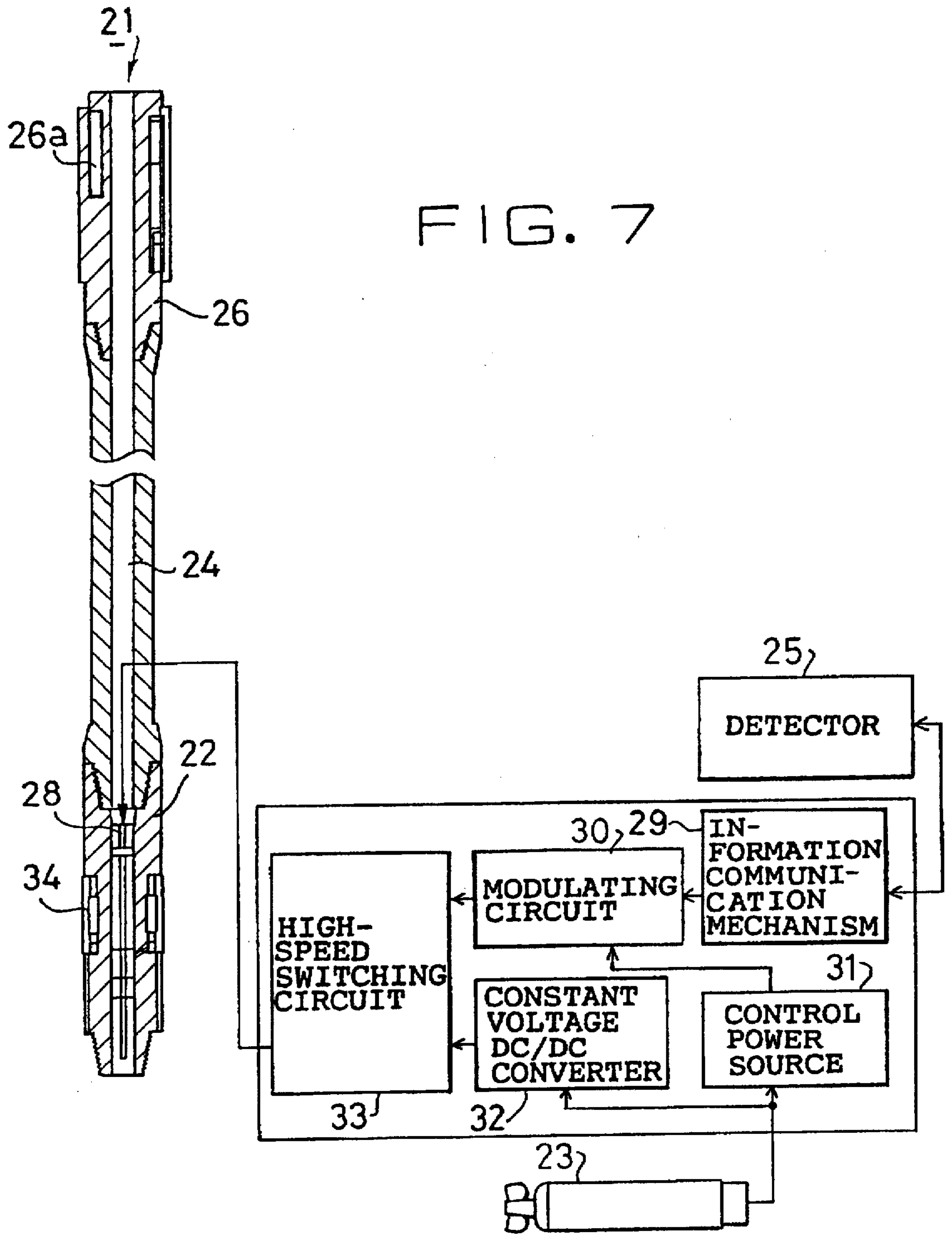
FIG. 7 is a diagram of a structure, illustrating a transmitter tube in the information transmitting apparatus shown in FIG. 6.

FIG. 6 is a diagram showing a structure of an information transmitting apparatus using a tube body according to one embodiment of the present invention. FIG. 7 is a diagram of a structure, illustrating a transmitter tube 21 in the information transmitting apparatus shown in FIG. 6. In FIGS. 6 and 7, reference numeral 21 means the transmitter tube containing a transmitter, and 22 is a resonance tube body containing a magnetostriction generation control unit as will be described infra. Further, a magnetostrictive vibrator (magnetostrictive device) 34 as will be described infra is mounted at an intermediate position of the resonance tube body 22. Reference numeral 23 means a mud turbine generator, 24 is a drill pipe, 25 is a detector at a pit bottom, 26 is a receiving tube (a sound wave receiver) containing an acoustic sensor 26*a*, and 27 is a logging station mounted on the surface for recording and storage of data.

Reference numeral 28 means the magnetostriction generation control unit mounted to the resonance tube body 22 to feed exciting current and impulse current to the magnetostrictive vibrator 34. Reference numeral 29 means an information network mechanism for communication with the detector 25, and 30 is a modulation circuit to impact modulate the data detected by the detector 25 into transmission signals from the pit bottom to the surface. Reference numeral 31 means a control power source to feed power supplied from the mud turbine generator 23 to the modulating circuit 30 and other electronic circuits at constant voltage, 32 is a constant voltage DC/DC converter to feed large current to the vibrator, and 33 is a high-speed switching circuit (an exciting impulse current generating circuit) to conduct the impulse current. Reference numeral 34 means the magnetostrictive vibrator to receive the exciting current from the magnetostriction generation control unit 28 so as to provide magnetostriction. The magnetostriction generates an elastic wave which causes resonance of the resonance tube body 22 at its natural frequency. The resonance generates an elastic wave in the resonance tube body 22, and the elastic wave is propagated through the drill string.

"Impact modulation" as used herein means a modulation mode to modulate one bit information by, typically, one impact impulse. For example, the information is represented by modulating a bit "1" with the impact impulse applied to the magnetostrictive vibrator 34, and modulating another bit "0" with no impact impulse applied to the magnetostrictive vibrator 34. The elastic wave generated by the impact modulation from the magnetostrictive vibrator 34 causes resonance of the resonance tube body 22. Thus, there is an effect in that energy can be more effectively transmitted to the drill pipe serving as a transmitting medium than would be in a conventional mode in which carrier waves are transmitted to the tube body through the coupling combination. In this case, it is also possible to modulate the one bit information by a plurality of impact impulses.

Next, a description will now be given of a structure of the magnetostrictive vibrator 34.

FIG. 8 is a perspective view showing a structure of the magnetostrictive vibrator 34 in the transmitter tube 21 shown in FIG. 7. In the drawing, reference numeral 35 means magnetostrictive material having a core form, and 36 is an exciting winding which is wound in a direction perpendicular to a distortion direction of the magnetostrictive material 35. The exciting current is fed to the exciting winding 36 to establish a magnetic field in the magnetostrictive material 35. The magnetic field can generate sharp magnetostriction in the magnetostrictive material 35. As the magnetostrictive material 35 generating the distortion by application of the magnetic field, there are well-known ultra-magnetostrictive materials such as Terfenol-D in addition to a metallic magnetostrictive material such as nickel or cobalt. In the embodiment, for example, nickel-base magnetostrictive material is used as metallic material having high material strength.

It is assumed that the magnetic field is applied to the magnetostrictive material 35 by conducting the sharp impulse current in the exciting winding 36, and the magnetostrictive material 35 is made of metal such as nickel. In this case, eddy current occurs in the magnetostrictive material 35 in response to a variation in the magnetic field in a direction to cancel an external magnetic field in a section (i.e., in a plane perpendicular to the magnetic field) of the magnetostrictive material 35. Consequently, there is generated a phenomenon in which an effective magnetic field can not be applied into the magnetostrictive material 35. In order to avoid the phenomenon, the magnetostrictive material 35 includes insulating layers, and includes stack of thin plate-type magnetostrictive materials 35*a* shown in FIG. 8B. In such a way, the magnetostriction generating on only a surface of the magnetostrictive material 35 can be generated in an entire structure of the stack of magnetostrictive material.

Figure 8A:
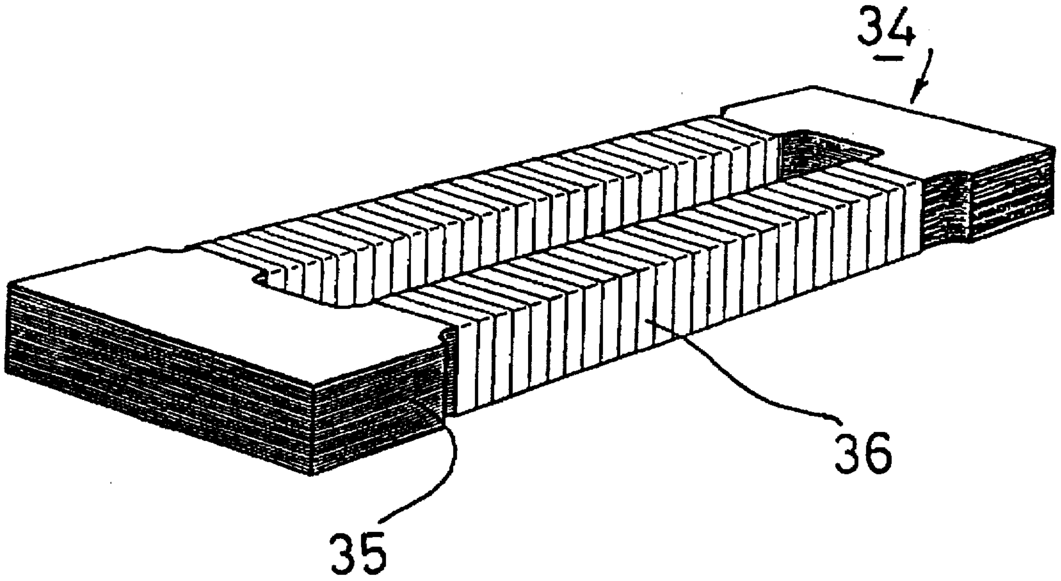
FIG. 8A is a perspective view showing a structure of a magnetostrictive vibrator in the transmitter tube shown in FIG. 7.
Figure 8B:
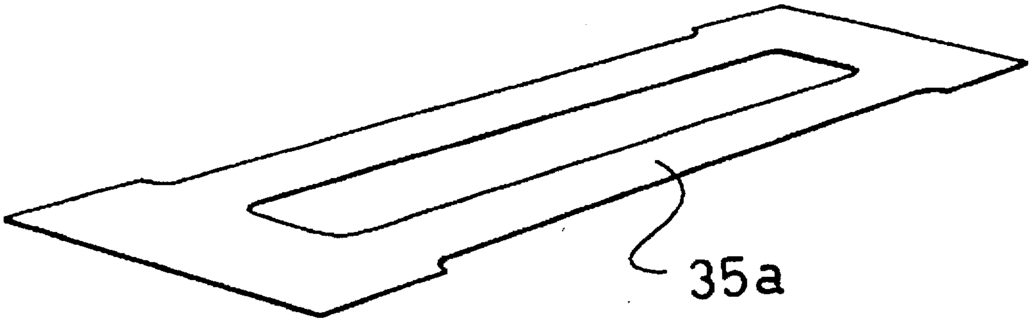
FIG. 8B is a perspective view showing a magnetostrictive material forming the magnetostrictive vibrator shown in FIG. 8A.
Figure 9:
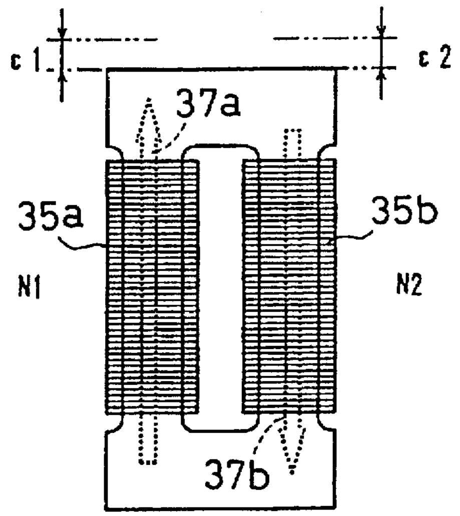
FIG. 9 is a side view showing a magnetic circuit in the magnetostrictive vibrator shown in FIG. 8A.
Figure 10:
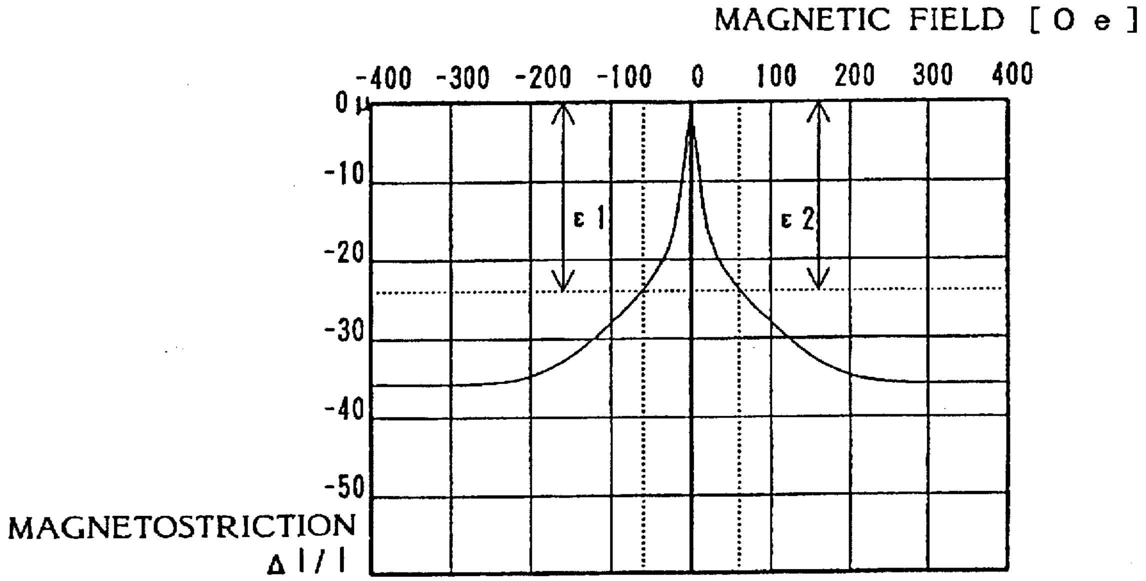
FIG. 10 is a graph diagram showing a magnetostrictive characteristic of the magnetostrictive material of the magnetostrictive vibrator shown in FIG. 8A.

FIG. 9 is a side view showing a magnetic circuit in the magnetostrictive vibrator shown in FIG. 8A, and FIG. 10 is a graph diagram showing a magnetostrictive characteristic of the magnetostrictive material 35 of the magnetostrictive vibrator shown in FIG. 8A. In the magnetostrictive material 35, the applied magnetic field causes the distortion having a one-way retractable characteristic irrespective of a direction of the magnetic field. If the magnetostrictive material 35 is made of pure nickel, the same characteristic can be observed as shown in FIG. 10. The magnetostrictive vibrator 34 includes a blocked circuit as shown in FIG. 9, and the respective exciting windings 35*a* and 35*b* are wound by the same numbers of winding times N1 and N2 in directions opposed to one another. Thereby, in the magnetostrictive vibrator 34, the exciting windings 35*a* and 35*b* establish the magnetic fields serving as the magnetically blocked circuits in the magnetostrictive material 35. Though magnetic fields 37*a* and 37*b* are established in the opposite directions at both ends of the magnetostrictive vibrator 34, variations $\epsilon 1$ and $\epsilon 2$ in magnetostriction at longitudinal end surfaces are caused in the same direction on the right and left sides. Thus, as a whole, the magnetostrictive vibrator 34 is extendable and retractable in a longitudinal direction. In other words, the magnetically blocked circuit effectively provides magnetostriction, while contributing little to magnetic leakage.

Figure 11A:
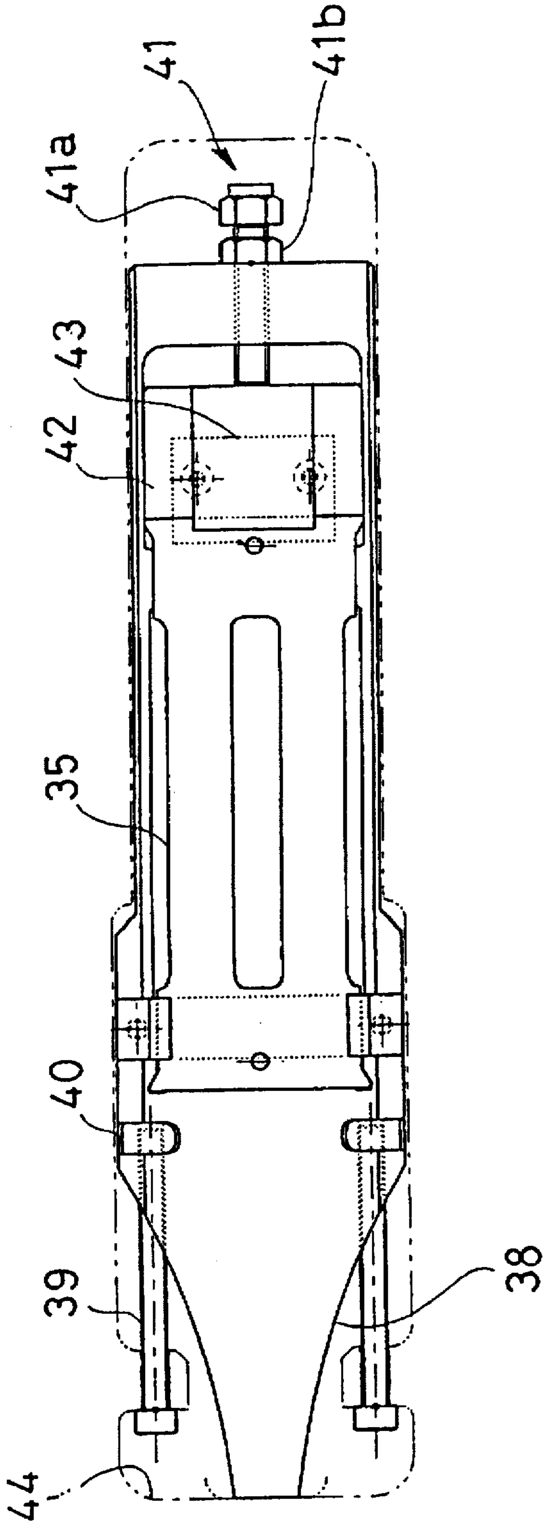
FIG. 11A is a plan view showing the magnetostrictive vibrator shown in FIG. 8A.
Figure 11B:
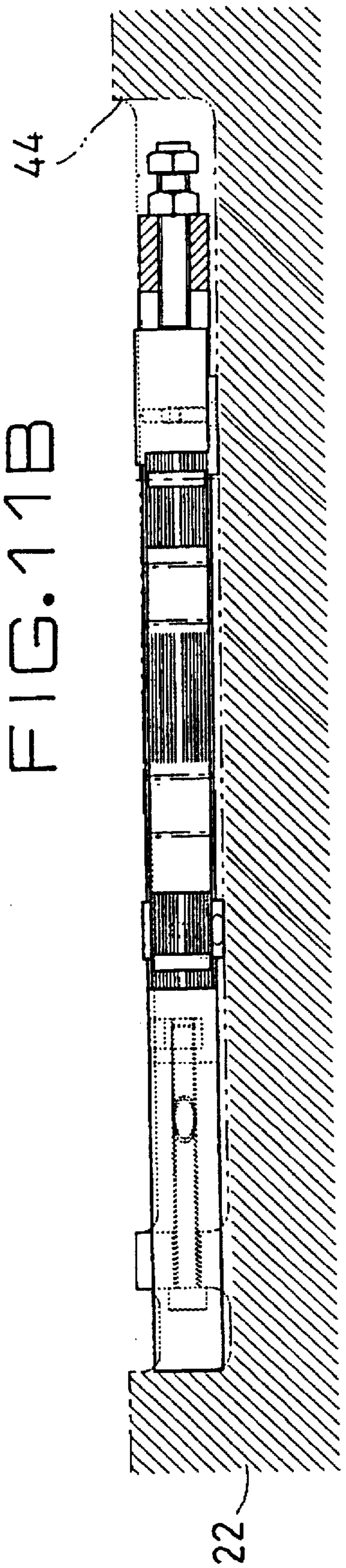
FIG. 11B is a side sectional view showing the information transmitting apparatus using the tube body according to an embodiment of the present invention, with its magnetostrictive vibrator mounted into a resonance tube body.

FIG. 11A is a plan view showing the magnetostrictive vibrator 34 shown in FIG. 8A, and FIG. 11B is a side sectional showing a state in which the magnetostrictive vibrator 34 is mounted into the resonance tube body 22. In FIGS. 11A and 11B, reference numeral 38 means an acoustic horn connected to an acoustic radiation surface of the magnetostrictive material 53. The acoustic horn is pressed in contact with the resonance tube body 22 by constant mounting torque caused by fixing bolts 39 and fixing nuts 40. Reference numeral 41 means preload mechanism to use a jack bolt 41*a* and a jam nut 41*b* so as to tightly contact the magnetostrictive material 35 with the acoustic horn 38 through a patch 42. Reference numeral 43 means a pressing plate to adjust the magnetostrictive material 35 in a vertical direction, and 44 is a packaging recess provided in the resonance tube body 22 as an accommodating groove for the magnetostrictive vibrator 34.

Further, the acoustic horn 38 is connected to a radiation surface of the magnetostrictive vibrator 34 such that sharp exciting force generated in the magnetostrictive vibrator 34 can be efficiently transmitted to the resonance tube body 22 in the energy transmission to the resonance tube body 23. The acoustic horn 38 is provided in an exponential form serving as a theoretical form to concentrate energy, to (exponentially) concentrate and amplify energy density of the exciting force caused by impulse type acceleration, thereby efficiently injecting the energy into the resonance tube body 22.

In this embodiment, it is necessary to surely and tightly contact the magnetostrictive vibrator 34 with a transmission surface in order to transmit the sharp exciting force generated in the magnetostrictive vibrator 34 to the resonance tube body 22 efficiently and safely in view of mechanical strength. That is, when any gap is interposed between the magnetostrictive vibrator 34 and a wall surface of the resonance tube body 22, the sharp magnetostriction generates the exciting force which may cause impact destruction at the magnetostrictive vibrator 34, the acoustic horn 38, the wall surface of the resonance tube body 22 or the like. The preload is mounted to surely and tightly contact the magnetostrictive vibrator 34 with the wall surface of the resonance tube body 23 so as to avoid the impact destruction. When the magnetostrictive vibrator 34 is mounted into the resonance tube body 22 in reality, the preload mechanism 41 may be extended by rotating the jack bolt 41*a* of the preload mechanism 41 after the magnetostrictive vibrator 34 is inserted into the mounting recess 44. In such a way, it is possible to tightly fit a head portion of the preload mechanism 41 and the acoustic horn 38 with the mounting recess 41, resulting in no gap between the magnetostrictive vibrator 34 and the resonance tube body 22.

Next, a description will now be given of a vibration waveform when the magnetostrictive vibrator 34 is disposed at an intermediate position of the resonance tube body 22.

Figure 12:
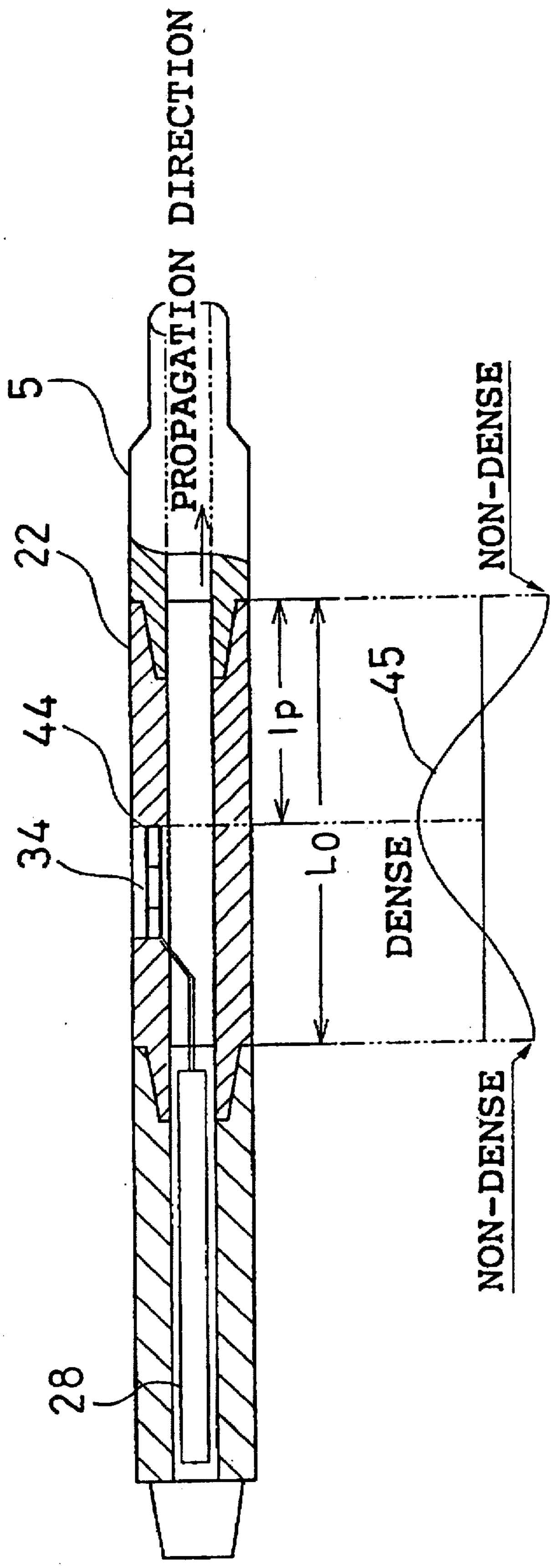
FIG. 12 is a waveform diagram showing a vibration when the magnetostrictive vibrator is disposed at an intermediate position of the resonance tube body in the information transmitting apparatus using the tube body according to the embodiment of the present invention.

FIG. 12 is a waveform diagram showing a vibration when the magnetostrictive vibrator 34 shown in FIG. 8A is disposed at the intermediate position of the resonance tube body. When a vibration injecting position of the magnetostrictive vibrator 34 is set at the intermediate position of the resonance tube body 22, an elastic wave 45 is generated to have frequency components with an entire length of the resonance tube body 22 as one cycle. If a propagation velocity in the drill pipe 24 is known, it is possible to obtain optional resonance frequency according to a length of the drill pipe 24 by modifying the entire length of the resonance tube body 22. The entire length of the resonance tube body 22 can be found by the required resonance frequency and the propagation velocity of the elastic wave of the resonance tube body 22 as follows:

$$L_0=V/f_{c0} \quad (1)$$

where $L_0$: entire length of the resonance tube body 22 (m)

V: propagation velocity (m/s)

$f_{c0}$: resonance frequency (Hz)

For example, if the propagation velocity V of the elastic wave propagated through the drill pipe 24 is 5,005 m/sec, the entire length $L_0$ of the resonance tube body 22 is 2.78 m, and the acoustic horn 38 is mounted at a position of 1.39 m, it is possible to obtain the resonance frequency $f_{c0}$ of 1,800 Hz.

As set forth above, when the magnetostrictive vibrator 34 is mounted into the resonance tube body 22 which resonates at the same frequency as natural frequency of the magnetostrictive vibrator 34, vibration energy generating in the resonance tube body 22 is added to vibration energy of an elastic wave generating in the magnetostrictive vibrator 34. As a result, the vibration energy of the magnetostrictive vibrator 34 can be increased.

Further, the magnetostrictive vibrator 34 is disposed at the intermediate position of the resonance tube body 22, and the maximum vibration energy in the resonance tube body 22 can be generated thereat. Thus, it is possible to further increase the vibration energy of the magnetostrictive vibrator 34.

A description will now be given of the magnetostriction generation control unit 28 in the transmitter tube 21 shown in FIG. 7.

Figure 13:
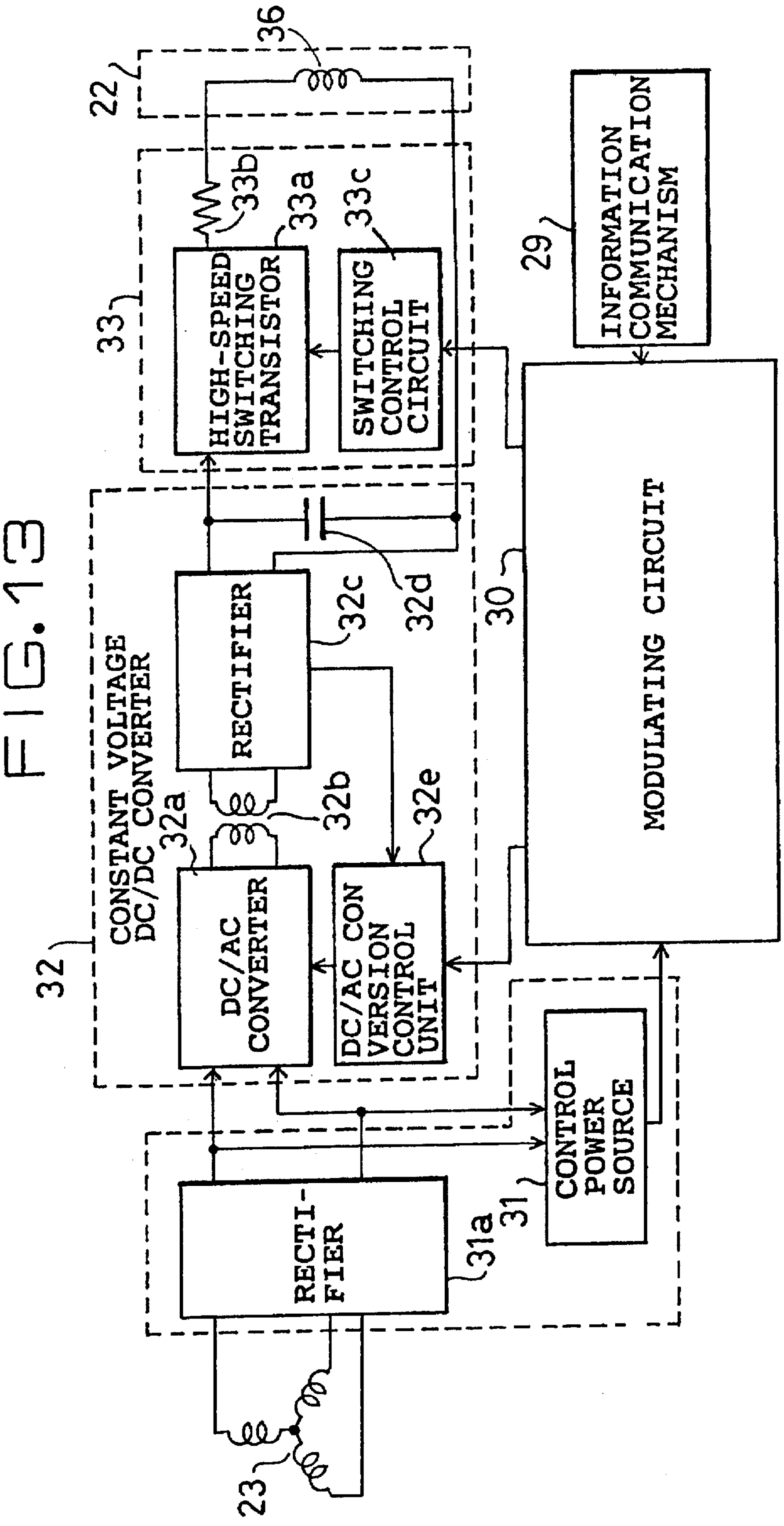
FIG. 13 is a diagram showing a structure of a magnetostriction generation control unit in the information transmitting apparatus using the tube body according to the embodiment of an present invention.
Figure 14:
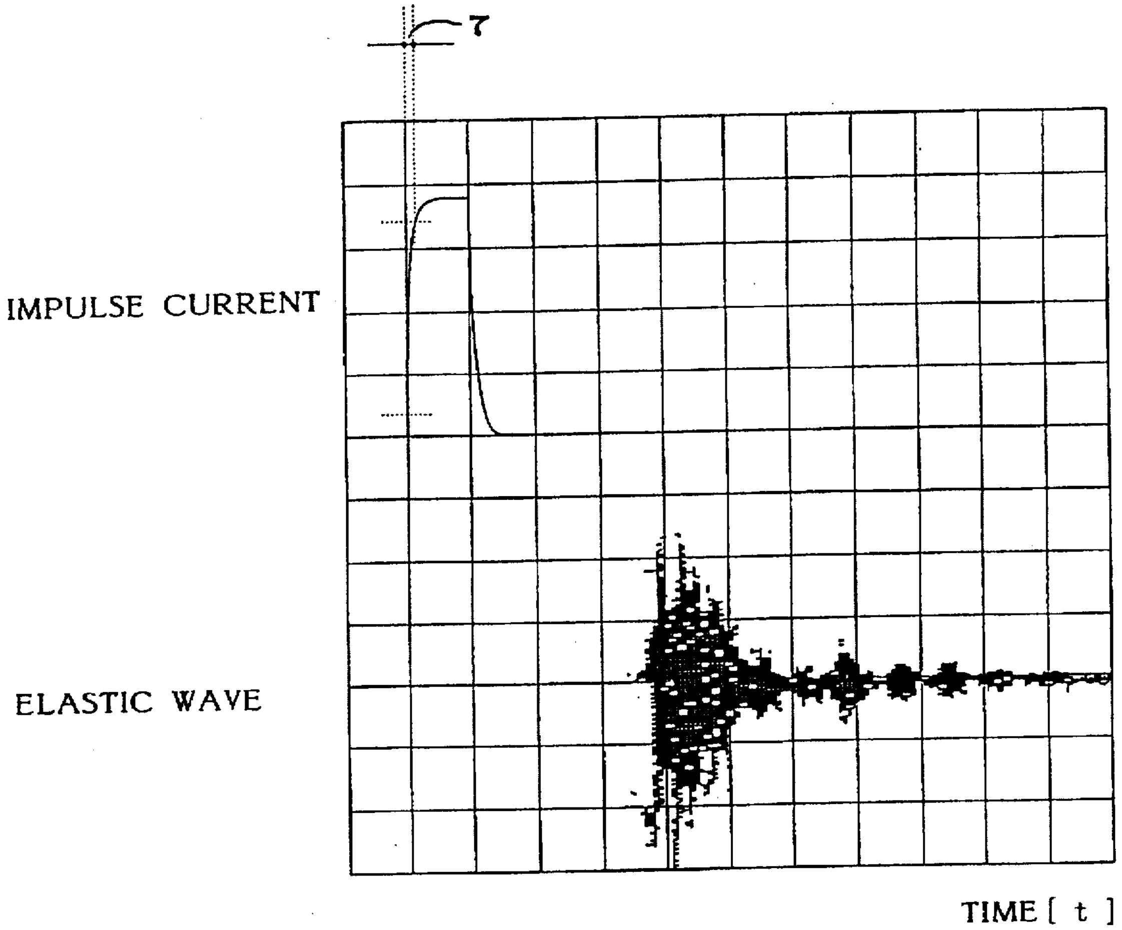
FIG. 14 is a waveform diagram showing an elastic wave propagated through a drill pipe when impulse current is applied to the magnetostrictive vibrator in the information transmitting apparatus using the tube body according to an embodiment of the present invention.

FIG. 13 is a diagram showing a structure of the magnetostriction generation control unit 28, and FIG. 14 is a waveform diagram showing an elastic wave propagated through the drill pipe 24 when impulse current is applied to the magnetostrictive vibrator 34. In FIG. 13, reference numeral 31*a* means a rectifier, 32*a* is a DC/AC converter, 32*b* is a voltage changer, 32*c* is a rectifier, 32*d* is a capacitor, 32*e* is a DC/AC conversion control unit, and 33 is a high-speed switching circuit. The high-speed switching circuit 33 is a driver to feed charge charged in the capacitor 32*d* through an external resistor 33*b*, and is driven by a high-speed switching transistor 33*a* which can conduct large current. A switching control circuit 33*c* is a circuit to control a gate of the switching transistor 33*a*. Further, the switching control circuit 33*c* drives the switching transistor 33*a* according to output timing of a pulse generating circuit in the modulating circuit 30, and generates the impulse current by rapid switching of the charge stored in the capacitor 32*d*. As shown in FIG. 14, the impulse current has sharp rise time τ, and serves as current pulse having a rise time which is substantially identical with a rise response velocity of the magnetostrictive material 35. The rise time of the pulse current is determined by inductance L and internal resistance r of the magnetostrictive vibrator 34. Consequently, the external resistor 33*b* is in series with the magnetostrictive vibrator 34 to conduct the impulse current having the sharp rise.

The impulse current is outputted from the high-speed switching circuit 33 to flow in the exciting winding 36 wound on the magnetostrictive vibrator 34 so as to establish a magnetic field having magnitude in proportional to the impulse current inside the magnetostrictive material 35. It is possible to neglect a reaction of the eddy current in the magnetostrictive material 35 in a direction opposed to the magnetic field (since the magnetostrictive vibrator 34 has a stack structure). Therefore, a rise of the magnetic field in the magnetostrictive material 35 is proportional to amplitude of the impulse current. The magnetostrictive material 35 is distorted in proportion to the internal magnetic field so that an acoustic elastic wave is generated at a rise velocity given by the rise time τ (FIG. 14). The rise time z is defined by the inductance L of the magnetostrictive vibrator 34 and the resistance R of the external resistor 33*b* (see FIG. 14). It is possible to find acceleration at a time of generation of the magnetostriction by the following expression 2:

$$a=\Delta 1/(\Delta t)^2 \quad (2)$$

where

Δ1: amount of distortion

Δt: rise time

When the pure nickel is employed as the magnetostrictive material 35, Δ1 can be set at several micrometers and Δ2 can be set at tens microseconds. It is thereby possible to realize acceleration of about 1,000 G.

Subsequently, a description will be given of the elastic wave propagated through the drill pipe by the impulse current applied to the magnetostrictive vibrator.

Figure 15:
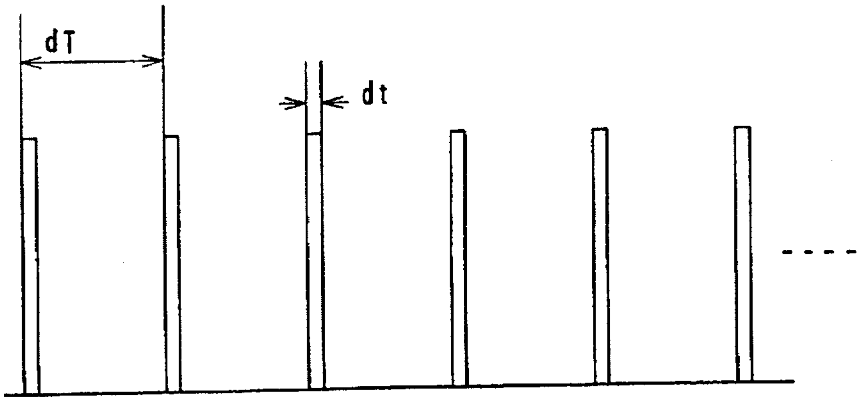
FIG. 15 is a waveform diagram showing impulse current trains applied to an exciting winding of the magnetostrictive vibrator in the information transmitting apparatus using an tube body according to the embodiment of the present invention.
Figures 16A, 16B:
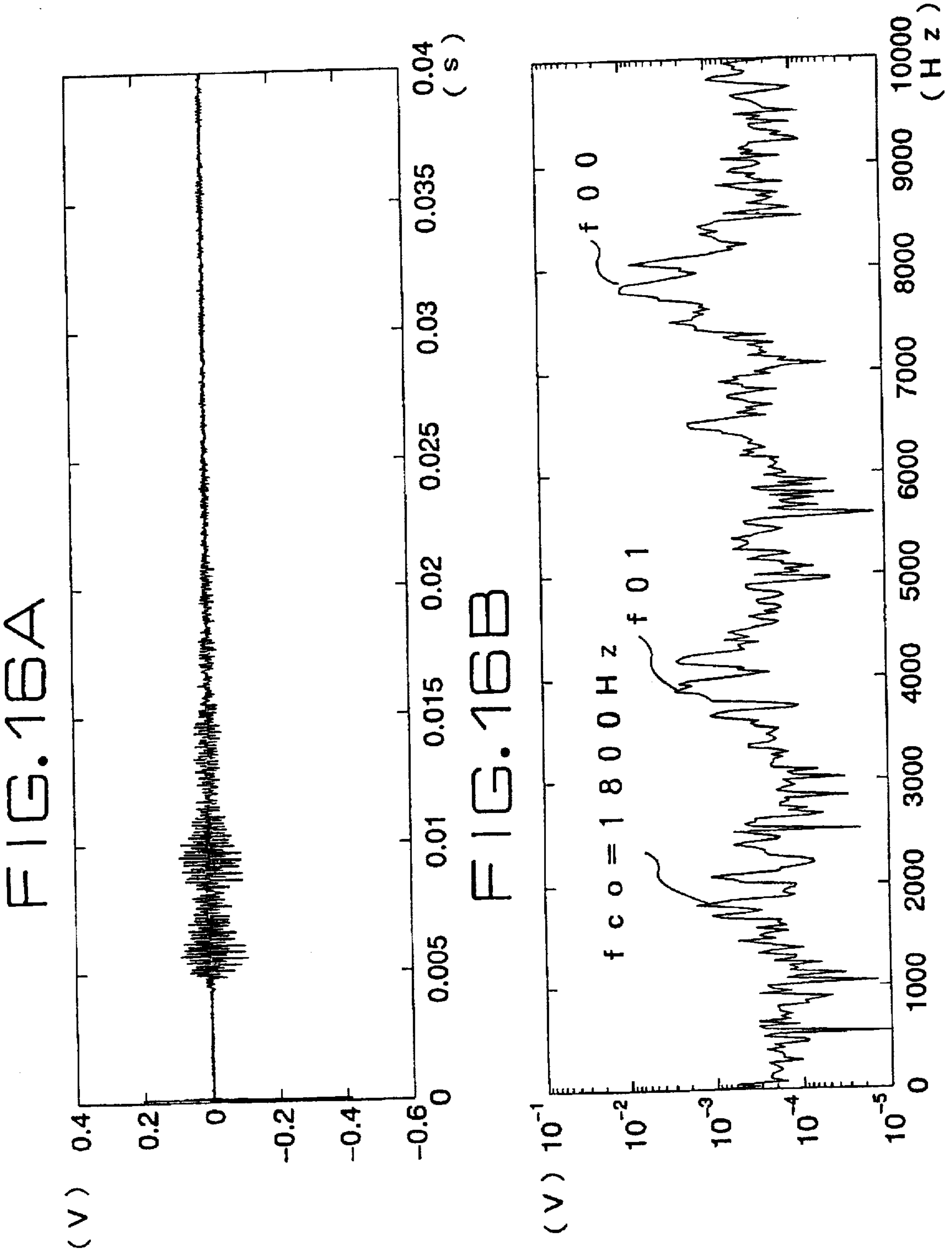
FIG. 16A is a waveform diagram showing an elastic wave when frequency of impulse current applied to the magnetostrictive vibrator is not equalized with natural frequency of the resonance tube body in the information transmitting apparatus using the tube body according to an embodiment of the present invention.
FIG. 16B is a waveform diagram showing frequency components of the elastic wave when the frequency of the impulse current applied to the magnetostrictive vibrator is not equalized with the natural frequency of the resonance tube body in the information transmitting apparatus using an tube body according to the embodiment of the present invention.
Figure 17A:
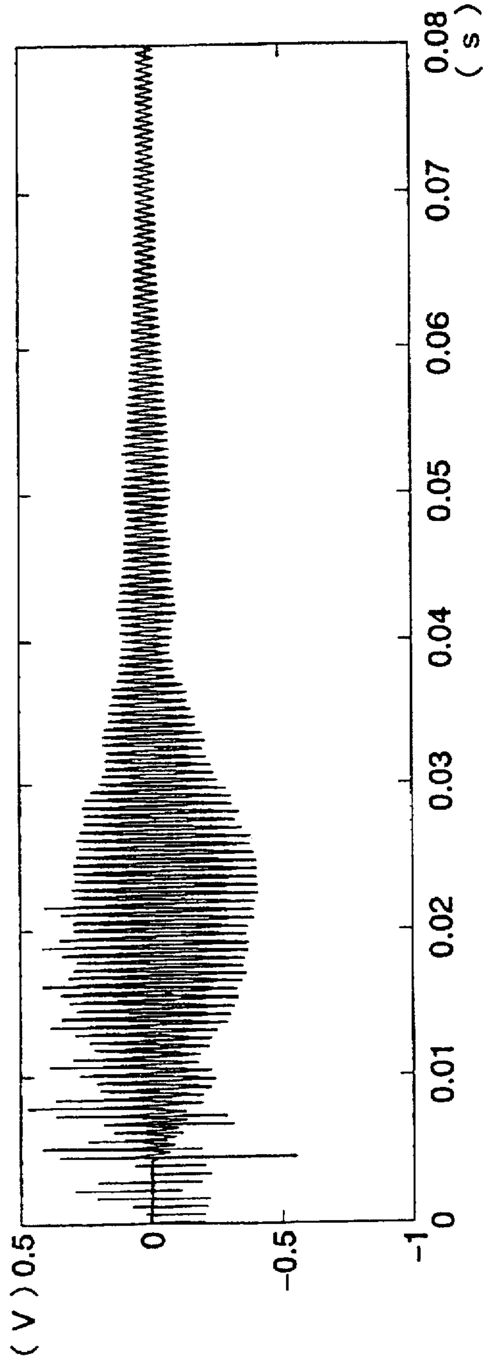
FIG. 17A is a waveform diagram showing an elastic wave when the frequency of the impulse current applied to the magnetostrictive vibrator is equalized with the natural frequency of the resonance tube body in the information transmitting apparatus using the tube body according to an embodiment of the present invention.
Figure 17B:
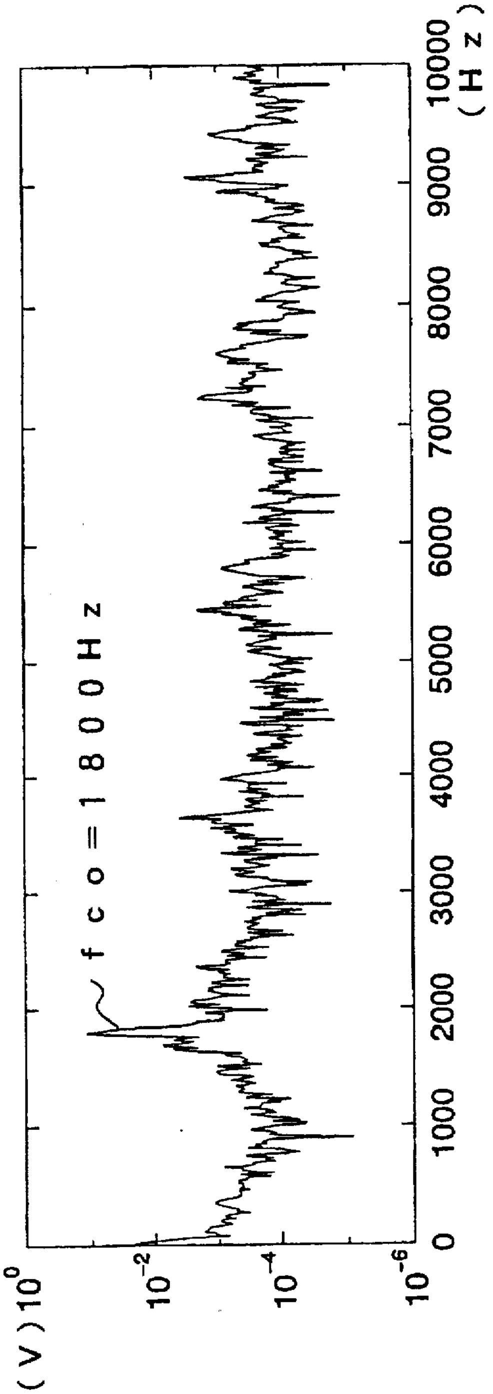
FIG. 17B is a waveform diagram showing frequency components of the elastic wave when the frequency of the impulse current applied to the magnetostrictive vibrator is equalized with the natural frequency of the resonance tube body in the information transmitting apparatus using an tube body according to the embodiment of the present invention.

FIG. 15 is a waveform diagram showing impulse current trains applied to the exciting winding 36 of the magnetostrictive vibrator 34. FIG. 16A is a waveform diagram showing an elastic wave when frequency of the impulse current applied to the magnetostrictive vibrator 34 is not equalized with the natural frequency of the resonance tube body. FIG. 16B is a waveform diagram showing frequency components of the elastic wave when the frequency of the impulse current applied to the magnetostrictive vibrator 34 is not equalized with the natural frequency of the resonance tube body. FIG. 17A is a waveform diagram showing an elastic wave when the frequency of the impulse current applied to the magnetostrictive vibrator 34 is equalized with the natural frequency of the resonance tube body. FIG. 17B is a waveform diagram showing the frequency components of the elastic wave when the frequency of the impulse current applied to the magnetostrictive vibrator 34 is equalized with the natural frequency of the resonance tube body.

In FIG. 16B, reference numerals $f_{00}$ and $f_{01}$ mean natural frequencies of the magnetostrictive vibrator 34, and $f_{c0}$ is the natural frequency of the resonance tube body 22 (see FIG. 7). As impulse current having a more rapid rise than distortion response velocity of the magnetostrictive material 35, impulse current is set to have, for example, a pulse width dt of 40 microseconds, and ten pulses an inter-train pause T of 555 microseconds in the embodiment. When the impulse current flows in the magnetostrictive vibrator 34 to rapidly generate the magnetostriction, extremely high vibration acceleration exceeding, for example, 1,000 G is generated.

Accordingly, by the vibration acceleration, the magnetostrictive vibrator 34 resonates at the frequencies $f_{00}$ and $f_{01}$ according to the structure and dimension of the magnetostrictive vibrator 34, thereafter transmitting the vibration acceleration to the resonance tube body 22 including the magnetostrictive vibrator 34. Then, the resonance tube body 22 resonates at the frequency $f_{c0}$ defined by the structure and the dimension of the resonance tube body 22 (see FIG. 16B).

In this case, a constant level resonance frequency can be generated though voltage having the resonance frequency $f_{c0}$ of the resonance tube body 22 has lower amplitude of voltage than that having the resonance frequencies $f_{00}$ and $f_{01}$ of the magnetostrictive vibrator 34.

Further, the frequency of the impulse current applied to the magnetostrictive vibrator 34 is equalized with the natural frequency $f_{c0}$ of the resonance tube body 22. That is, as shown by the following expression 3, an impulse cycle of the magnetostrictive vibrator 34 is equalized with the natural frequency $f_{c0}$ of the resonance tube body 22, thereby increasing the vibration energy. As a result, a frequency component of the natural frequency $f_{c0}$ of the resonance tube body 22 becomes larger as shown in FIG. 17A.

$$dT=1/f_{c0} \tag{3}$$

where dT: time interval of the impulse current applied to the magnetostrictive vibrator $f_{c0}$: natural frequency of the resonance tube body As set forth above, the resonance tube body 22 is provided to have the structure having dimension to permit resonance with the desired frequency. Further, the relatively small magnetostrictive vibrator 34 is mounted into the resonance tube body 22 to apply the plurality of impulse currents to the magnetostrictive vibrator 34, thereby forcedly causing resonance of the resonance tube body 22 at its natural frequency $f_{c0}$. It is thereby possible to generate an elastic wave having a lower frequency according to the length of the drill pipe 24 in the resonance tube body 22.

A description will now be given of the impact modulation.

Figure 1:
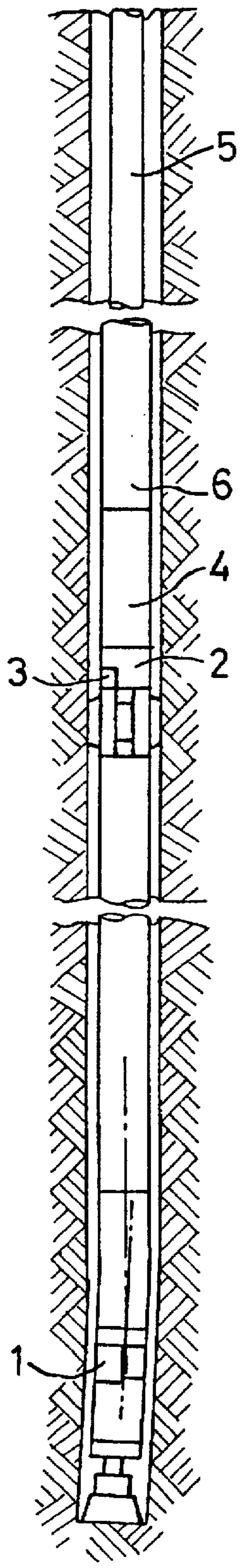
FIG. 1 (PRIOR ART)
FIG. 1 is a side view of a system structure at a pit bottom, showing a conventional information transmitting system using a tube body.
Figure 2:
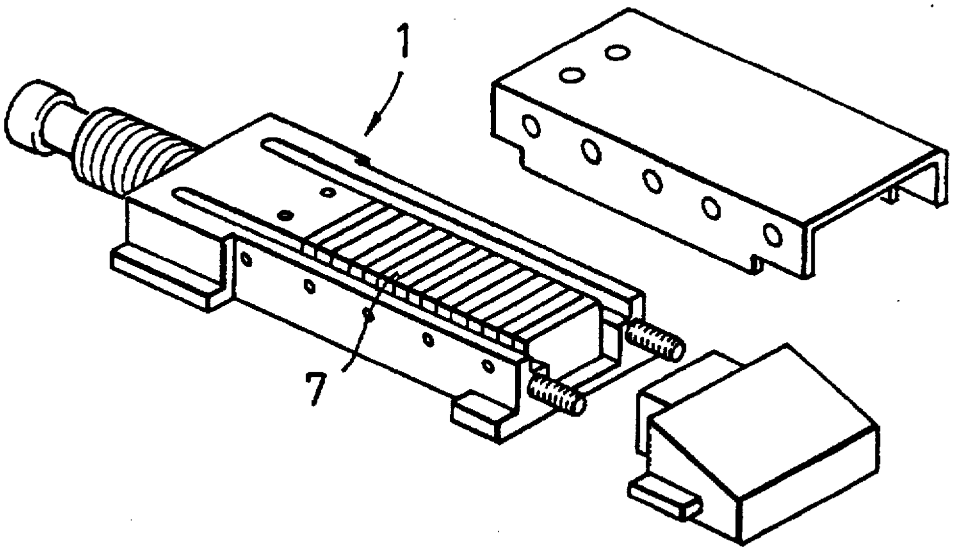
FIG. 2 (PRIOR ART)
FIG. 2 is an exploded perspective view showing a structure of an oscillator in the conventional system shown in FIG. 1.
Figure 3:
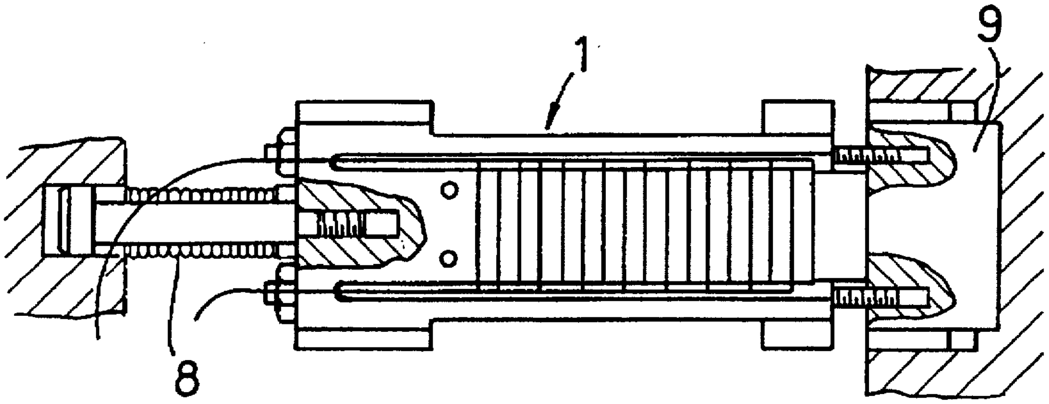
FIG. 3 (PRIOR ART)
FIG. 3 is a sectional view of the oscillator shown in FIG. 2.
Figure 4A:
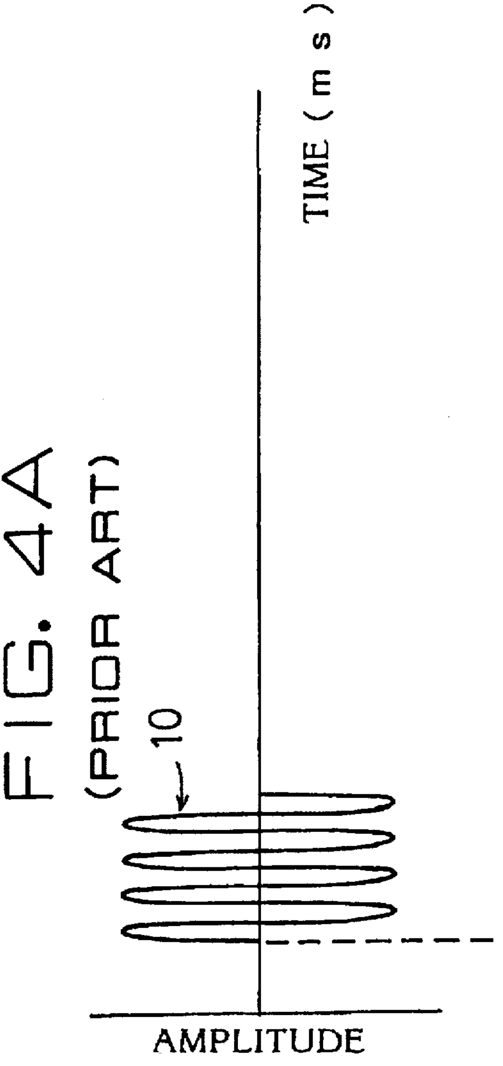
FIG. 4A (PRIOR ART)
FIG. 4A is a waveform diagram showing a drive voltage waveform of the oscillator of the conventional information transmitting apparatus using the tube body shown in FIG. 1.
Figure 4B:
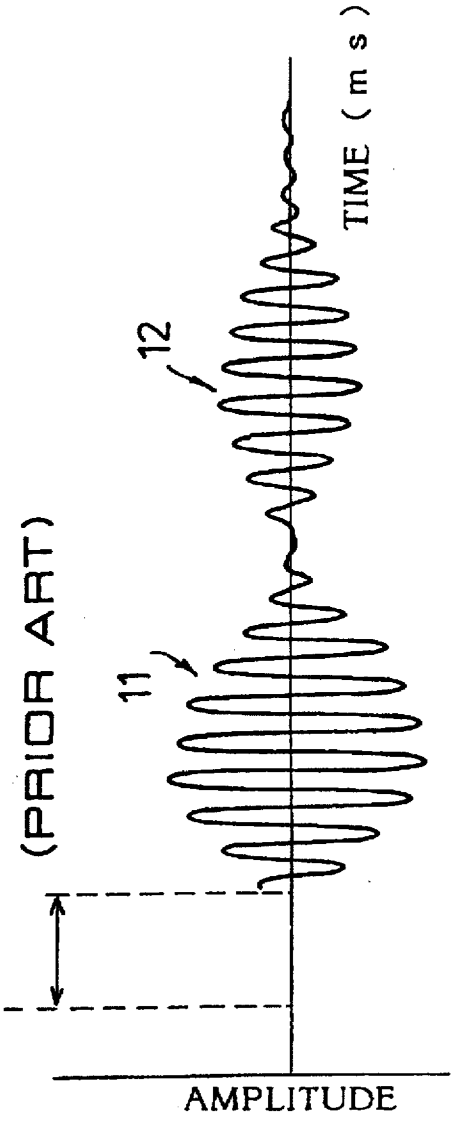
FIG. 4B (PRIOR ART)
FIG. 4B is a waveform diagram showing a propagated signal waveform in the conventional information transmitting apparatus shown in FIG. 1.
Figure 5A:
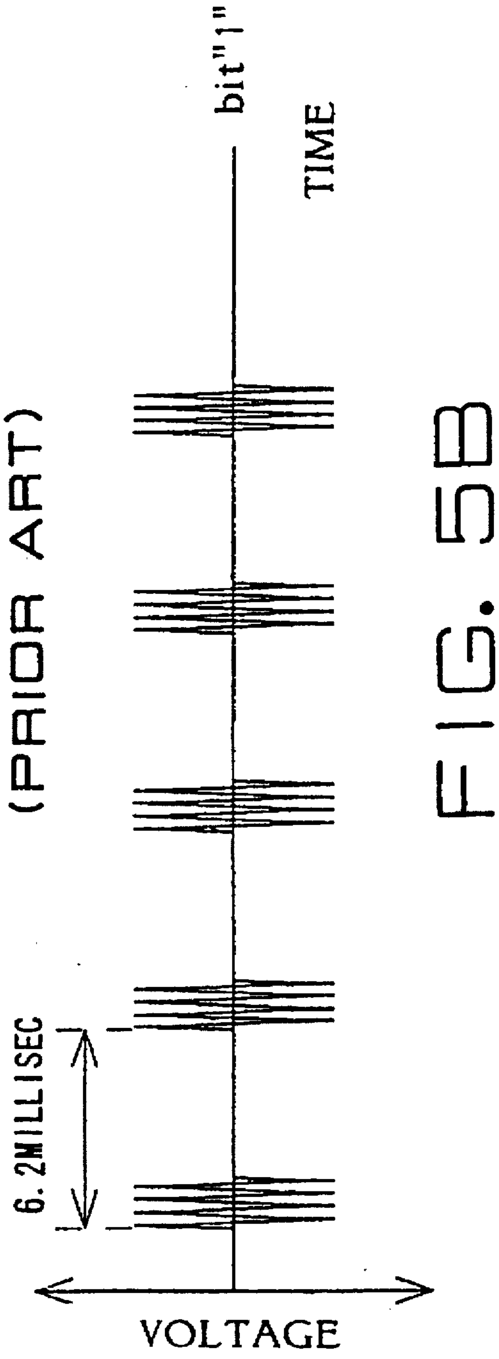
FIG. 5A (PRIOR ART)
FIG. 5A is a voltage waveform diagram showing the bit "1" applied to the oscillator of the conventional information transmitting apparatus shown in FIG. 1.
Figure 5B:
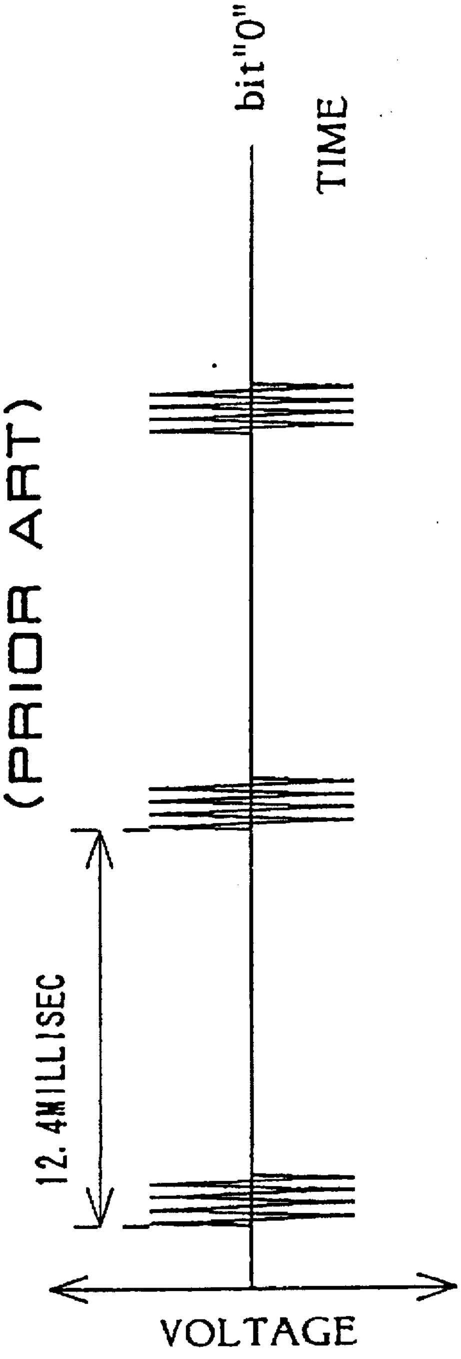
FIG. 5B (PRIOR ART)
FIG. 5B is a voltage waveform diagram showing the bit "0" applied to the oscillator of the conventional information transmitting apparatus shown in FIG. 1.
Figure 18:
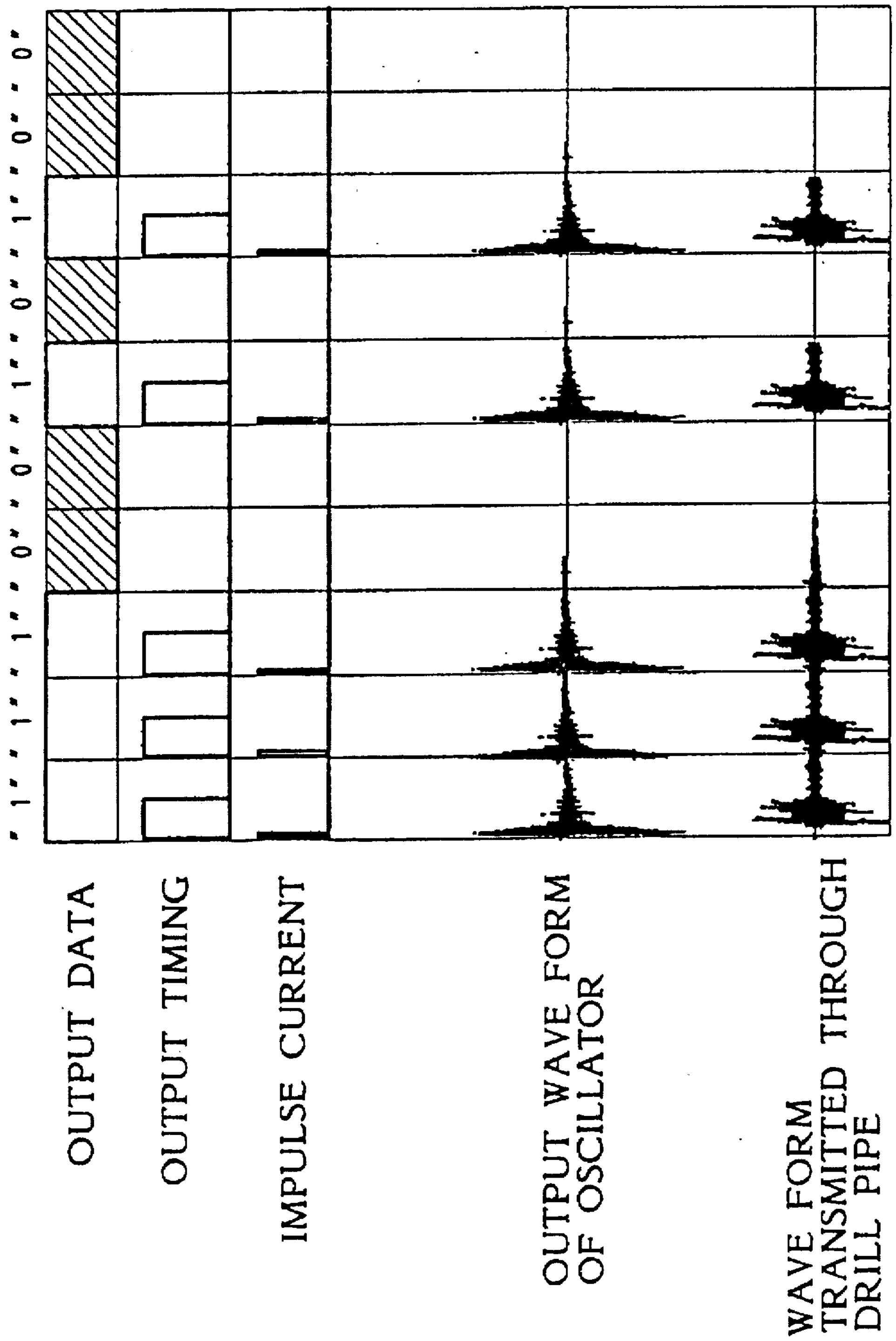
FIG. 18 is a waveform diagram showing output waveforms of modulating signals in the information transmitting apparatus using the tube body according to an embodiment of the present invention.

FIG. 18 is a waveform diagram showing output waveforms of modulating signals of the information transmitting apparatus using the tube body according to the embodiment of the present invention. The modulating circuit 30 has a function to digitally encode and modulate information collected by the detector 25 (see FIG. 2) at the pit bottom. On the basis of the modulated signals, drive pulse trains are outputted from the high-speed switching circuit 33. The impact modulation as described above is carried out in the embodiment.

The impact modulation generates the pulse trains whose time interval is determined by a propagation characteristic of the drill pipe 24. This is because an acoustic waveform propagated through the drill pipe 24 is damped, reflected, and dispersed during the propagation to generate interference between successive pulses. Hence, the next one-bit information is sent after a time interval required to demodulate the digitally encoded one-bit information so as to read the information. In FIG. 18, the top line shows bit information of output data, and the second line shows output timing to send the information. In the drawing, an illustration is made with reference to transmission of data having a bit-string "1110010100." A bit rate of 10 bits/sec results in the timing, i.e., a bit interval of 100 msec, and a bit rate of 100 bits/sec results in the bit interval of 10 msec. Drive current is outputted according to the output timing as shown in the third line. The magnetostrictive vibrator 34 is vibrated according to the impulse current as shown in the fourth line, to generate impulse type acceleration as shown by the output waveform. The waveform in the bottom line shows a propagation waveform through the drill pipe 24, which is generated by excitation of impact force according to the acceleration.

Next, a description will now be given of the operation of the information transmitting apparatus using the tube body shown in FIGS. 6 and 7.

At the pit bottom, various types of detectors 25 are disposed in the vicinity of a drill pit (not shown) to detect various information as set forth above, and the detected information are received through the information network mechanism 29 in the transmitter tube 21 to be impact modulated by the modulating circuit 30. That is, the current having the rise velocity identical with the response velocity of the magnetostrictive material 35 of the magnetostrictive vibrator 34, flows in the exciting winding 36 of the magnetostrictive vibrator 34 through the high-speed switching circuit 33. The current is cut off when the magnetic field reaches a target value. Then, the magnetostrictive material 35 is extended or extracted by its material characteristic, and the extendable characteristic generates extremely high acceleration to generate the elastic wave. The elastic wave causes resonance of resonance tube body 22, and the resonance generates another elastic wave having frequency inherent in the resonance tube body. The signal of the elastic wave is propagated through the drill string to reach the ground receiving tube 26.

The receiving tube 26 detects the signal propagated through the drill string to send the signal from a transmitting antenna (not shown) to the logging station 7 after removal of low-frequency noise through a filter (not shown). In the logging station 7, radio waves are received by a receiving antenna (not shown) and a radio receiver (not shown) to be demodulated by a demodulating apparatus (not shown) into original data. By a data output device (not shown), the demodulated data are stored in a disk, are printed as time information or drilling process information, or are indicated on a display unit. Further, the logging station 7 communicates with other drilling or stratum analytic systems.

As set forth above, according to the present invention, the exciting current is fed to the magnetostrictive device depending upon the underground information to generate the elastic wave. Concurrently, the elastic wave causes resonance of the resonance tube body, and the resonance vibration generates the elastic wave having the frequency inherent in the resonance tube body to propagate the elastic wave through the drill string. This can eliminate the need for the coupling combination for a modulating carrier wave, required to employ conventional piezoelectric ceramics. As a result, there are effects of enhanced transmission efficiency of the underground information through the tube body, and of further extension of a transmission distance.

While the preferred embodiment of the invention has been described using specific terms, such description is for illustrative purposes only, and it is to be understood that changes and variations may be made without departing from the spirit or scope of the following claims.

What is claimed is:

1. An information transmitting apparatus using a drill string, said drill string including one or more interconnected tube bodies, comprising:

a detector disposed in the vicinity of a distal end of said drill string to detect underground information;

a magnetostriction generation control unit to output exciting current depending upon said underground information from said detector;

a subsurface magnetostrictive device having a magnetostrictive material to generate an elastic wave by magnetostriction, to generate a first elastic wave according to the exciting current from said magnetostriction generation control unit;

a resonance tube body mounted in the vicinity of the distal end of said drill string, to resonate with said elastic wave generated from said magnetostrictive device, and propagate a second elastic wave generated by the resonance vibration to the other end of said drill string; and a sound wave receiver to receive said second elastic wave propagated through said drill string and having frequency inherent in said resonance tube body, and convert said second elastic wave into electric information so as to output the information;

wherein said magnetostrictive device is secured to a wall of said resonance tube body, wherein said resonance tube body resonates at a natural cycle which is determined by a propagation velocity of said first elastic wave generated from said magnetostrictive device and an entire length of said resonance tube body.

2. An information transmitting apparatus according to claim 1, wherein said magnetostriction generation control unit includes an exciting impulse current generating circuit to feed exciting impulse current to said magnetostrictive device, and applying said exciting impulse current having a more rapid rise than a distortion response velocity of said magnetostrictive device to said magnetostrictive device so as to generate impulse type distortion acceleration in said magnetostrictive device, thereby causing resonance of said resonance tube body according to said distortion acceleration.

3. An information transmitting apparatus according to claim 1, wherein a frequency of said exciting current fed to said magnetostrictive device is equalized with a natural frequency of said resonance tube body.

4. An information transmitting apparatus according to claim 1, wherein said magnetostrictive device is disposed at an intermediate position of said resonance tube body so as to provide the maximum amplitude of vibration of said resonance tube body.

5. An information transmitting apparatus using a tube body according to claim 1, wherein said magnetostriction generation control unit includes an exciting impulse current generating circuit to feed exciting impulse current to said magnetostrictive device, and applying said exciting impulse current having a more rapid rise than distortion response velocity of said magnetostrictive device to said magnetostrictive device so as to generate impulse type distortion acceleration in said magnetostrictive device, thereby causing resonance of said resonance tube body according to said distortion acceleration.

6. An information transmitting apparatus according to claim 1, wherein said magnetostrictive device is disposed at an intermediate position of said resonance tube body so as to provide the maximum amplitude of vibration of said resonance tube body.

7. An information transmitting apparatus according to claim 3, wherein said magnetostrictive device is disposed at an intermediate position of said resonance tube body so as to provide the maximum amplitude of vibration of said resonance tube body.

8. An information transmitting apparatus according to claim 4, wherein said magnetostrictive device is disposed at an intermediate position of said resonance tube body so as to provide the maximum amplitude of vibration of said resonance tube body.

9. An information transmitting apparatus according to claim 6, wherein said magnetostrictive device is disposed at an intermediate position of said resonance tube body so as to provide the maximum amplitude of vibration of said resonance tube body.

10. An information transmitting apparatus using a drill string, said drill string including one or more interconnected tube bodies, comprising:

a detector disposed in the vicinity of a distal end of said drill string to detect underground information;

a magnetostriction generation control unit to output exciting current depending upon said underground information from said detector;

a magnetostrictive device having a magnetostrictive material to generate an elastic wave by magnetostriction, to generate a first elastic wave according to the exciting current from said magnetostriction generation control unit;

a resonance tube body mounted in the vicinity of the distal end of said drill string, to resonate with said elastic wave generated from said magnetostrictive device, and propagate a second elastic wave generated by the resonance vibration to the other end of said drill string; and a sound wave receiver to receive said second elastic wave propagated through said drill string and having frequency inherent in said resonance tube body, and convert said second elastic wave into electric information so as to output the information;

wherein said exciting current fed to said magnetostrictive device is chosen to produce said second elastic wave in said resonance tube body to have a natural frequency $f_{c0}$ of said resonance tube body, thereby maximizing the transfer of said second elastic wave through said drill string, wherein said resonance tube body resonates at a natural cycle which is determined by a propagation velocity of said first elastic wave generated from said magnetostrictive device and an entire length of said resonance tube body.

* * * * *